(12) United States Patent
Tomblin et al.

(10) Patent No.: US 11,169,323 B2
(45) Date of Patent: Nov. 9, 2021

(54) THERMOPLASTIC-COATED OPTICAL ELEMENTS

(71) Applicant: Zeus Industrial Products, Inc., Orangeburg, SC (US)

(72) Inventors: Brian R. Tomblin, Columbia, SC (US); Shannon M. Giovannini, Columbia, SC (US); Matthew W. Cox, St. Matthews, SC (US); Aaron E. Hydrick, Cayce, SC (US)

(73) Assignee: Zeus Industrial Products, Inc., Orangeburg, SC (US)

( * ) Notice: Subject to any disclaimer, the term of this patent is extended or adjusted under 35 U.S.C. 154(b) by 271 days.

(21) Appl. No.: 15/291,323

(22) Filed: Oct. 12, 2016

(65) Prior Publication Data

US 2017/0299807 A1    Oct. 19, 2017

Related U.S. Application Data

(60) Provisional application No. 62/323,195, filed on Apr. 15, 2016, provisional application No. 62/374,110, filed on Dec. 8, 2016.

(51) Int. Cl.
*G02B 6/02* (2006.01)
*G02B 6/44* (2006.01)

(52) U.S. Cl.
CPC ......... *G02B 6/02395* (2013.01); *G02B 6/443* (2013.01); *G02B 6/4436* (2013.01)

(58) Field of Classification Search
CPC .. G02B 6/02395; G02B 6/443; G02B 6/4436; G02B 6/02; G02B 6/44
See application file for complete search history.

(56) References Cited

U.S. PATENT DOCUMENTS 3,980,390 A  *  9/1976  Yamamoto .......... C03C 25/1065
                                                    385/123
4,687,293 A  *  8/1987  Randazzo ............ G02B 6/4402
                                                    385/102
(Continued)

FOREIGN PATENT DOCUMENTS

GB     2 214 652 B      9/1989
JP     5449526          1/2014
WO     WO 2015/079463   5/2015    ............... G02B 6/44

OTHER PUBLICATIONS

Optacore Selects Solvay's KetaSpire® PEEK & AvaSpire® PAEK for Optical Fiber Systems—Published Apr. 5, 2016—SpecialChem.
(Continued)

*Primary Examiner* — Andrew Jordan
(74) *Attorney, Agent, or Firm* — Jessica Gorczynski; Womble Bond Dickinson (US) LLP

(57) ABSTRACT

Polymeric coated optical elements are described herein, which exhibit good optical properties, e.g., low attenuation. Some such coated optical elements comprise an optical element (e.g., an optical fiber) having an outer surface and a thermoplastic polymeric tight buffer coating on at least a portion of the outer surface of the optical element, wherein the polymer-coated optical element exhibits a first attenuation at room temperature of plus or minus about 50% the attenuation of a comparable optical element with no thermoplastic polymeric tight buffer coating thereon, and a second attenuation at room temperature after thermal cycling to a temperature of at least 170° C. that is about 2 times the first attenuation or less.

14 Claims, 3 Drawing Sheets

(56) References Cited

U.S. PATENT DOCUMENTS

| | | | | |
|---|---|---|---|---|
| 4,696,542 A * | 9/1987 | Thompson | D07B 1/0693 | 385/107 |
| 4,770,493 A | 9/1988 | Ara et al. | | |
| 4,799,762 A * | 1/1989 | Kakuta | C03C 25/1065 | 385/128 |
| 4,848,869 A * | 7/1989 | Urruti | G02B 6/443 | 118/689 |
| 5,293,442 A | 3/1994 | Sayegh | | |
| 5,644,670 A * | 7/1997 | Fukuda | G02B 6/0288 | 385/124 |
| 5,675,686 A * | 10/1997 | Rosenmayer | G02B 6/443 | 385/114 |
| 6,298,188 B1 * | 10/2001 | Chapin | C03C 25/1065 | 385/102 |
| 6,374,023 B1 | 4/2002 | Parris | | |
| 6,650,815 B2 * | 11/2003 | Hawtof | G02B 6/03694 | 385/128 |
| 6,701,047 B1 * | 3/2004 | Rutterman | G02B 6/4413 | 385/102 |
| 6,768,853 B2 * | 7/2004 | Neveux, Jr. | C03C 25/1065 | 385/126 |
| 6,911,258 B1 * | 6/2005 | Prigent | C03C 25/101 | 174/11 OR |
| 6,915,052 B2 * | 7/2005 | Boogh | G02B 6/443 | 385/100 |
| 6,957,002 B2 * | 10/2005 | Cottevieille | C03C 25/50 | 385/123 |
| 7,003,197 B2 * | 2/2006 | Andre | C03C 25/1065 | 385/10 |
| 7,085,470 B2 * | 8/2006 | Miyoshi | G02B 6/02038 | 385/100 |
| 7,162,130 B2 * | 1/2007 | Castellani | G02B 6/02395 | 264/1.24 |
| 7,397,991 B1 | 7/2008 | Register | | |
| 7,433,566 B2 * | 10/2008 | Bookbinder | G02B 6/02342 | 385/123 |
| 7,542,644 B2 * | 6/2009 | Tanaka | C03C 25/1065 | 385/114 |
| 8,017,674 B2 * | 9/2011 | Sano | C09J 11/04 | 524/495 |
| 8,096,712 B2 * | 1/2012 | Solomon | G02B 6/3801 | 385/95 |
| 9,052,486 B2 | 6/2015 | Messer | | |
| 9,335,503 B2 * | 5/2016 | Kachmar | G02B 6/4432 | |
| 9,442,264 B1 * | 9/2016 | Cheatle | G02B 6/443 | |
| 9,770,862 B2 * | 9/2017 | Swinehart | B29C 65/02 | |
| 9,784,933 B2 * | 10/2017 | Osenbach | G02B 6/4251 | |
| 9,822,035 B2 * | 11/2017 | Hokansson | C03C 25/1075 | |
| 9,907,496 B1 * | 3/2018 | Okandan | A61B 5/1459 | |
| 2003/0026568 A1 * | 2/2003 | Hawtof | G02B 6/03694 | 385/128 |
| 2003/0235382 A1 * | 12/2003 | Neveux, Jr. | C03C 25/1065 | 385/128 |
| 2004/0228594 A1 * | 11/2004 | Andre | C03C 25/1065 | 385/128 |
| 2005/0031277 A1 * | 2/2005 | Japon | G02B 6/443 | 385/109 |
| 2005/0135763 A1 * | 6/2005 | Drenzek | G02B 6/245 | 385/128 |
| 2005/0238309 A1 * | 10/2005 | Drenzek | G02B 6/02 | 385/128 |
| 2006/0045421 A1 * | 3/2006 | Baets | G02B 6/4201 | 385/33 |
| 2006/0088263 A1 * | 4/2006 | Tanaka | C03C 25/1065 | 385/128 |
| 2006/0127019 A1 * | 6/2006 | Castellani | G02B 6/02395 | 385/128 |
| 2008/0013905 A1 * | 1/2008 | Bookbinder | G02B 6/02342 | 385/124 |
| 2008/0283272 A1 * | 11/2008 | Huston | G02B 6/443 | 174/110 PM |
| 2009/0060430 A1 | 3/2009 | Reed et al. | | |
| 2009/0103870 A1 * | 4/2009 | Solomon | G02B 6/3801 | 385/98 |
| 2009/0142024 A1 * | 6/2009 | Varma | G02B 6/4488 | 385/100 |
| 2010/0278491 A1 | 11/2010 | Noddings | | |
| 2011/0026889 A1 | 2/2011 | Risch et al. | | |
| 2012/0057833 A1 * | 3/2012 | Tatat | G02B 6/443 | 385/111 |
| 2015/0241651 A1 * | 8/2015 | Kachmar | G02B 6/4432 | 385/100 |
| 2016/0004023 A1 * | 1/2016 | Herbst | G02B 6/02395 | 385/128 |
| 2016/0178861 A1 * | 6/2016 | Osenbach | G02B 6/4251 | 385/14 |
| 2017/0010411 A1 * | 1/2017 | Li | G02B 6/02395 | |
| 2017/0010412 A1 * | 1/2017 | Racosky | C03C 25/106 | |
| 2017/0023756 A1 * | 1/2017 | Glew | G02B 6/4416 | |
| 2017/0023757 A1 * | 1/2017 | Kachmar | G02B 6/4402 | |
| 2017/0299807 A1 * | 10/2017 | Tomblin | G02B 6/02395 | |
| 2018/0044234 A1 * | 2/2018 | Hokansson | C03C 25/1062 | |

OTHER PUBLICATIONS

Origin of temperature dependence of microbending attenuation in fiber optic cables—Eric G. Hanson—Oct. 9, 2015—Fiber and Integrated Optics—pp. 113-148.

Space Flight Heritage of Optical Fiber Cables—Douglas Hardy; W.L. Gore & Associates; Newark, Delaware—Gore Created Technologies Worldwide—at least by Apr. 6, 2016.

Polymicro Technologies—Polymer Coatings for Silica Optical Fiber—2 page article—available to the public before the effective filing date of Apr. 15, 2016.

Low Speed Carbon Deposition Process for Hermetic Optical Fibers—Lindholm et al.—10 pages—available to the public before the effective filing date of Apr. 15, 2016.

PCT International Search Report & Written Opinion dated Sep. 15, 2017, which issued for corresponding PCT Application No. PCT/US2017/027519.

Fiber Optic Cabling Solutions—Loose Tube or Tight Buffered Fiber Optic Cable? (posted in "Bulk Fiber Cables" on Aug. 26, 2015, i.e., before the filing date of the present application and only shortly after the filing of the priority/provisional application).

Optical Cables—Integrated Publishing, Inc.

Cable Basics: Fiber Optic Cable—Belden, Inc.

Lightwave—Fiber-optic cable and system design basics—Pennwell Corporation—Aug. 1, 1995.

Fiber Optic Cable and Connector Selection—Fiber Cabling Solution—Oct. 14, 2015.

Fiber Optical Networking—Tight Buffer Cable VS Loose Tube Cable—Sep. 16, 2013.

Advances in Design and Development of Optical Fibers for Harsh Environments—Jie Li, Eric A. Lindholm, Jana Horska, and Jaroslaw Abramczyk—OFS Spcialty Photonics Division—Avon, CT—Jan. 1999.

NUsensor 1550 nm Bend-Insensitive Single-Mode Fibers—Nufern—Jul. 11, 2016.

Fiber Optic Terms and Definitions http://lightel.com/fiber-optic-terms-and-definitions.

Dupont Kapton—Summary of Properties; pp. 1-20.

CableLan Nuclear—Impact of Cable Material, Optical Fiber Design, and Cable Design on High Temperature Accident Survivability of Optical Fiber Cables—Brian G. Risch—pp. 1-3.

Loose Tube or Tight Buffered Fiber Optic Cable? http://www.cables-solutions.com/loose-tube-or-tight-buffered-fiber-optic-cable.html—pp. 1-2—Aug. 25, 2015.

Temperature dependence of polarization mode dispersion in tight-buffered optical fibers—Krzysztof Borzycki—pp. 56-66—Jan. 2008.

Ohya et al., Polyimide Membranes: Applications, Fabrications, and Properties, 1st Ed. CRC Press (Jan. 30, 1997)—Book page.

* cited by examiner

THERMOPLASTIC-COATED OPTICAL ELEMENTS

FIELD OF THE INVENTION

The present application is directed to polymer-coated optical fibers and fiber optic cables, which find application in a variety of fields.

BACKGROUND OF THE INVENTION

Optical fibers generally are long, thin strands of optically clear glass (silica) or plastic that are used to transmit light. Each fiber generally includes a transparent core (through which the light travels), surrounded by a transparent cladding material with a lower refractive index, which reflects light back into the transparent core. Optical fibers can be provided in bundles, called fiber optic cables, which can include one or more support components (e.g., a central cable or carrier) around which the fibers are bound. Fibers and fiber optic cables are used extensively in an array of industries with exemplary applications in the oil and gas, aerospace, telecommunications, aviation, nuclear, remote sensing, automotive, and medical industries.

One disadvantage to the use of optical fibers and fiber optic cables is that the glass or plastic itself is very susceptible to damage, e.g., cracking, during handling (having limited ability to flex and bend), rendering the strength of the bare glass or plastic rather low. As such, optical fibers and fiber optic cables are typically provided in coated form, with one or more polymeric coating layers generally coating each fiber. Such coatings make handling of optical fibers possible by providing mechanical protection to the fibers (significantly increasing the strength, e.g., tensile strength) thereof. Primary buffer coatings (also referred to as "primary coatings" or "primary buffer coatings") are typically added immediately following production of the core and cladding (e.g., as an in-line process with production of the core and cladding) and thus are in direct contact with the glass or plastic of the cladding.

For application in certain of the industries referenced herein above, an optical fiber or fiber optic cable must exhibit various other physical properties, e.g., to withstand exposure to harsh conditions of use. For example, for some applications, the optical fiber or fiber optic cable must exhibit one or more of heat resistance, chemical resistance, abrasion resistance, moisture/water resistance, and/or biocompatibility. As such, overlying the primary buffer coating, an outer polymeric coating or "jacket" is applied. The outer polymeric coating can be referred to as a "tight buffer" where it is in contact with the primary buffer, having no airspace there between, or a "loose buffer" where an airspace is intentionally present between the primary buffer and outer polymeric coating. An outer polymeric coating, e.g., in the form of a tight buffer, can be present around a single optical fiber or a bundle of optical fibers, i.e., a fiber optic cable.

Given that optical fibers and fiber optic cables are generally subjected to multiple physical processes before use, the fiber optic properties of the fiber or cable (e.g., signal loss/attenuation) may suffer as a result. Small cracks, microbends, or irregularities in a fiber can cause loss of energy (attenuation) as light travels down the fiber. It would be beneficial to provide optical fibers and fiber optic cables that with good optical properties (signal loss/attenuation) and particularly to provide optical fibers and cables that exhibit such desirable features over a broad range of environmental conditions (e.g., elevated temperature and/or cycled temperature).

SUMMARY OF THE INVENTION

The present invention relates to optical fibers and fiber optic cables with extruded polymeric coatings thereon. Advantageously, in certain embodiments, the attenuation of the disclosed coated optical element compares well with the attenuation of a corresponding optical element without the coating thereon. In some embodiments, the attenuation of the disclosed coated optical element does not increase significantly after thermal cycling, rendering certain such coated optical elements particularly useful in high-temperature applications.

In one aspect, the disclosure provides a thermoplastic polymer-coated optical element comprising: an optical element having an outer surface, wherein the optical element comprises an optical fiber having a core, cladding, and primary buffer coating; and a thermoplastic polymeric tight buffer coating on at least a portion of the outer surface of the optical element, wherein the polymer-coated optical element exhibits a first attenuation at room temperature of plus or minus 50% the attenuation of a comparable optical element with no thermoplastic polymeric tight buffer coating thereon, and wherein the polymer-coated optical element exhibits a second attenuation at room temperature after thermal cycling to a temperature of at least 170° C. that is about 2 times the first attenuation or less. In another aspect, the disclosure provides a thermoplastic polymer-coated optical element comprising: an optical element having an outer surface, wherein the optical element comprises an optical fiber comprising a core and cladding; and a thermoplastic polymeric tight buffer coating on at least a portion of the outer surface of the optical element, wherein the thermoplastic polymeric tight buffer coating has an average thickness of at least 50 microns, and wherein the polymer-coated optical element exhibits a first attenuation at room temperature of plus or minus 50% the attenuation of a comparable optical element with no thermoplastic polymeric tight buffer coating thereon, and wherein the polymer-coated optical element exhibits a second attenuation at room temperature after thermal cycling to a temperature of at least 170° C. that is about 2 times the first attenuation or less.

In a further aspect, the disclosure provides a thermoplastic polymer-coated optical element comprising: an optical element having an outer surface; wherein the optical element comprises an optical fiber having a core, cladding, and primary buffer coating; and a thermoplastic polymeric tight buffer coating on at least a portion of the outer surface of the optical element, wherein the polymer-coated optical element exhibits an attenuation at 1550 nm that is plus or minus 20% the attenuation at 1550 nm of a comparable optical element with no thermoplastic polymeric tight buffer coating thereon.

The composition of the thermoplastic polymeric tight buffer coating in various embodiments of the coated optical elements disclosed herein can vary. In some embodiments, the thermoplastic polymeric tight buffer coating comprises one or more of a polyaryletherketone (PAEK), a liquid crystal polymer, a polyamide-imide, and a polybenzimidazole. In some embodiments, the thermoplastic polymeric tight buffer coating is selected from the group consisting of polyetherketone (PEK), polyetheretherketone (PEEK), polyetherketoneketone (PEKK), polyetheretherketoneketone (PEEKK), polyetherketoneetherketoneketone (PEKEKK), and combinations thereof. In one specific embodiment, the thermoplastic polymeric tight buffer coating is PEEK. The thermoplastic polymeric tight buffer coating can, in some embodiments, consist essentially of a thermoplastic polymer and can, in some embodiments, comprise less than about 30% by weight of components other than the thermoplastic polymer or named polymer(s).

The optical element, in certain embodiments, is an optical fiber. Such optical fibers can generally comprise a core and a cladding. In some embodiments, the optical fibers of the disclosed coated optical elements comprise a core and cladding with no primary buffer coating thereon, i.e., the thermoplastic polymeric tight buffer coating is in direct contact with the cladding. Such optical fibers, in some embodiments, consist essentially of silica. In some embodiments, the optical fibers of the disclosed coated optical elements comprise a core and cladding with a primary buffer coating thereon, i.e., the thermoplastic polymeric tight buffer coating is in direct contact with the primary buffer coating. In some such embodiments, the core and cladding can consist essentially of silica and the primary buffer coating can vary and, in certain embodiments, comprises polyimide.

In some embodiments, the optical element is a fiber optic cable. The optical fibers making up the fiber optic cable can include or exclude primary buffer coatings as disclosed herein above. Furthermore, the entire bundle of optical fibers making up the fiber optic cable can optionally be contained within a cable primary buffer coating encapsulating the bundle of optical fibers. As such, the disclosure provides fiber optic cables with or without a cable primary buffer coating, which further comprise a thermoplastic polymeric tight buffer coating surrounding the outer diameter of a bundle of optical fibers (which as such, can be in direct contact with a portion of the primary buffer-coated and/or uncoated optical fibers) or surrounding a cable primary buffer coating encapsulating the bundle of optical fibers (which as such, can be in direct contact with the cable primary buffer coating).

The first attenuation can, in some embodiments, be plus or minus 20% the attenuation of a comparable optical element with no thermoplastic polymeric tight buffer coating thereon. In some embodiments, the first attenuation is less than or equal to the attenuation of a comparable optical element with no thermoplastic polymeric tight buffer coating thereon. For example, certain thermoplastic polymer-coated optical elements disclosed herein exhibit attenuations of roughly the same as the attenuation of the corresponding optical element without such a thermoplastic polymeric tight buffer coating thereon. Certain thermoplastic polymer-coated optical elements disclosed herein exhibit attenuations of +/− about 20% that of the corresponding "uncoated" (comparative) optical element, +/− about 10% that of the corresponding uncoated optical element, or +/− about 5% that of the corresponding uncoated optical element. In particular embodiments, the attenuation of certain thermoplastic polymer-coated optical elements is less than the attenuation of the corresponding "uncoated" (comparative) optical element. For example, some such thermoplastic polymer-coated optical elements exhibit first attenuation values that are 50%-100% the attenuation values of the corresponding "uncoated" (comparative) optical element. In particular embodiments, the first attenuation is less than 1.0 dB/km. The second attenuation, in certain embodiments, is about 1.5 times the first attenuation or less.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

Figure 1A:
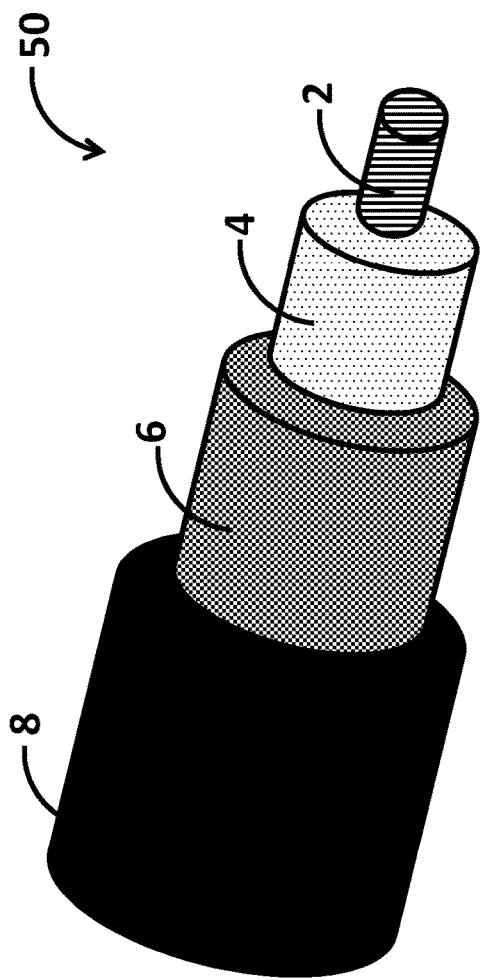
FIGS. 1A and 1B are schematic representations of certain coated optic fibers provided according to the present application, with 1A depicting an expanded longitudinal portion of the fiber and 1B depicting the cross-section of such a fiber.

The present invention will now be described more fully hereinafter with reference to the accompanying figures, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The disclosure relates generally to optical elements (e.g., fibers and fiber optic cables) comprising an outer polymeric tight buffer coating on at least a portion thereof, which exhibit particular optical properties. Optical elements are understood to comprise at least one optical fiber and may include individual optical fibers or bundles thereof, i.e., fiber optic cables. The outer polymeric tight buffer coating described herein can be applied to the surface of a single optical fiber and/or to a bundle of optical fibers in the context of a fiber optic cable.

The composition of the outer polymeric tight buffer coatings can vary. In some embodiments, the coating comprises a thermoplastic polymer, e.g., including, but not limited to, polyaryletherketone (PAEK), a liquid crystal polymer, a polyamide-imide (e.g., Torlon® PAI), polybenzimidamle (e.g., Celazole® polybenzimidazole), or any combination of the foregoing. PAEKs are a family of semicrystalline thermoplastic polyketones including, for example, polyetherketone (PEK), polyetheretherketone (PEEK), polyetherketoneketone (PEKK), polyetheretherketoneketone (PEEKK), and polyetherketoneetherketoneketone (PEKEKK). Exemplary PEEK resins include, but are not limited to, VICTREX® PEEK polymers (Victrex PLC), Vestakeep® PEEK (Evonik Industries AG), KetaSpire® PEEK (Solvay), and Ketron® PEEK (Quadrant). The thermoplastic polymeric tight buffer coating can comprise more than one thermoplastic polymer, such as a mixture, alloy, or copolymer of two or more, e.g., such that the coating comprises a mixture, alloy, or copolymer of LCP and PEEK or PBI and PEEK, or other combinations from the aforementioned polymeric families.

The coating materials are typically provided in the form of solid resins, which can be melted, applied to the optical element, and then cooled to provide a coating thereon. "Resin" as used herein refers to a material consisting essentially of a given type of polymer. Resins are typically provided in solid form (e.g., as solid pellets), although they are not limited thereto (with other forms including, but not limited to, powders, granules, dispersions, solutions, gels, and the like). In certain embodiments, polymeric resins are homopolymeric (i.e., comprising a single type of repeating monomer unit). In certain embodiments, polymeric resins are copolymeric resins, comprising, for example, alternating copolymers (having two or more monomer units in a regularly alternating arrangement), periodic copolymers (having two or more monomer units in a regularly repeating sequence), block copolymers (having two or more individual types of monomer segments connected by a covalent bond), or random copolymers (having two or more monomer units randomly arranged with respect to one another). In certain embodiments, polymeric resins can comprise binary copolymers (i.e., comprising two types of repeating monomer units). In certain embodiments, polymeric resins are terpolymeric (i.e., comprising three types of repeating monomer units). The compositions and molecular weights of the polymers in a particular resin can vary, as generally understood. Resins of various molecular weights are relevant to the coated optical elements provided herein. In some embodiments, the coatings disclosed herein can comprise polymers with various fillers contained therein, many of which are commercially available. In some embodiments, the coatings disclosed herein are prepared from pure resins, with no materials (e.g., fillers) intentionally added. Certain such resins have less than about 30%, less than about 20%, less than about 10%, less than about 5%, less than about 2%, less than about 1%, or less than about 0.5% by weight of added material, including resins with no added material, e.g., resins consisting essentially of the named polymer.

Generally, optical fibers comprise a central core and a cladding material, where both the central core and cladding material comprise silica. The core-to-cladding diameter ratio of the cables is not particularly limiting; however, it is generally understood that the cladding diameter is advantageously and commonly significantly larger than the core diameter. Although the disclosure focuses on optical elements comprising glass/silica-based fibers, it is not intended to be limited thereto and the disclosure in some embodiments is relevant in the context of plastic optical fibers (POFs) as well. Fibers can be, e.g., single-mode fibers, graded mode fibers, or multi-mode fibers; it is noted that, according to the present disclosure, the specific type of optical fiber is not particularly limited.

"Optical fiber" as used herein includes fibers with a central core and cladding that is covered with a protective, primary buffer coating or that is uncovered (e.g., consisting only of a central core and cladding). The primary buffer coating, where present, can comprise various materials and is generally polymeric. The composition of the primary buffer coating is not particularly limited in the context of the disclosed coated optical elements. Exemplary primary buffer coatings include, but are not limited to, polyimide and silicone materials. In some embodiments, the primary buffer coating is relatively thin, e.g., with an average thickness of less than about 50 microns and/or in some embodiments, the primary buffer coating does not comprise a thermoplastic polymer.

Figure 1B:
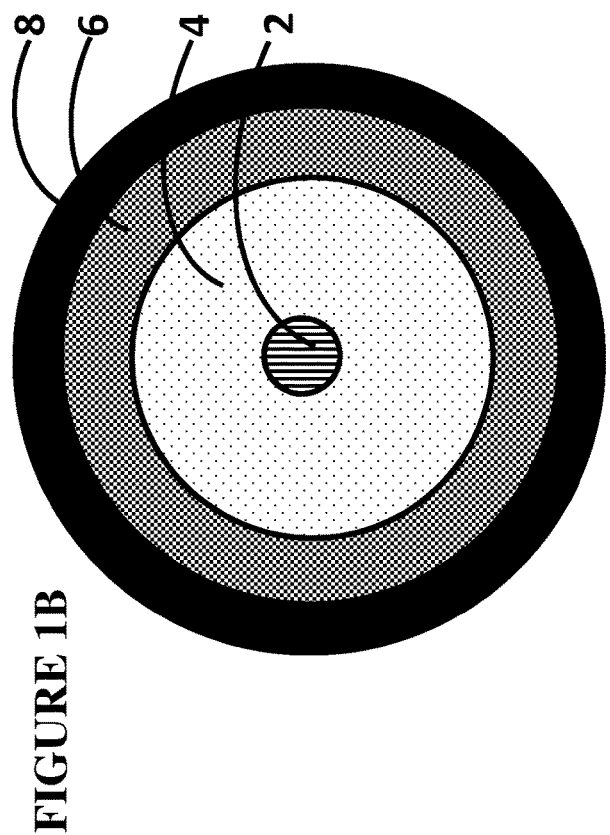
Figure 2A:
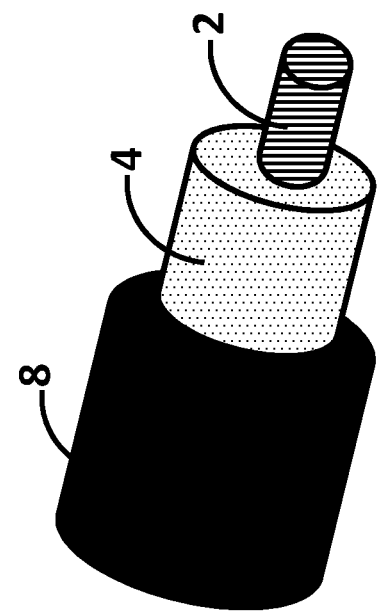
FIGS. 2A and 2B are schematic representations of certain coated optical fibers provided according to the present application, with 2A depicting an expanded longitudinal portion of the fiber and 2B depicting the cross-section of such a fiber.
Figure 2B:
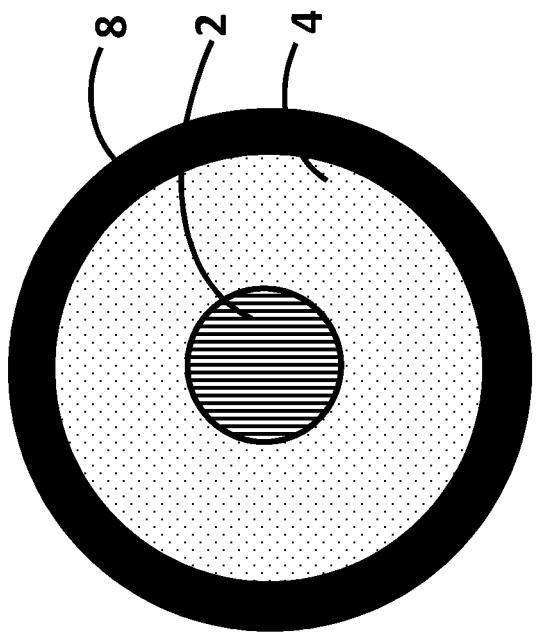
Figure 3A:
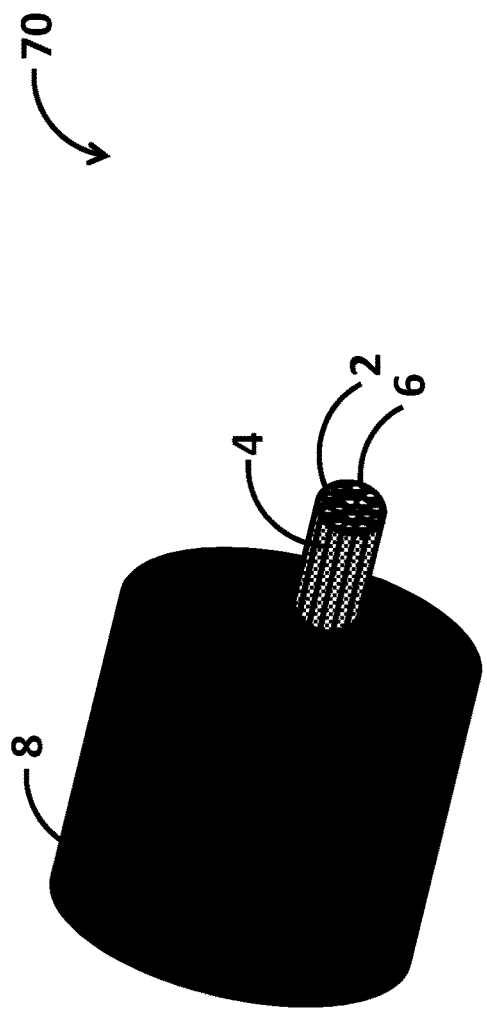
FIGS. 3A and 3B are schematic representations of certain coated fiber optic cables provided according to the present application, with 3A depicting an expanded longitudinal portion of the cable and 3B depicting the cross-section of such a cable.
Figure 3B:
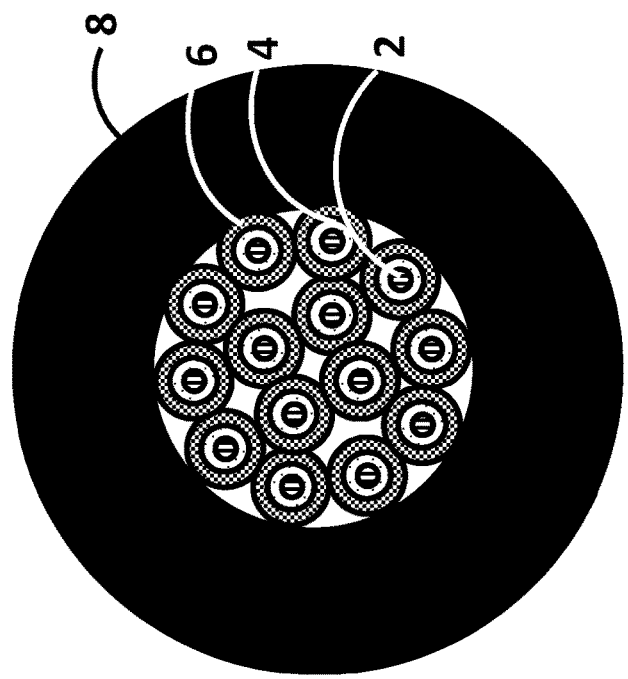

FIGS. 1A and 1B depict one exemplary coated optical fiber 50 provided in accordance with the present disclosure, comprising a core 2, a cladding 4, a primary buffer coating 6 in contact with the cladding, and an outer polymeric (tight buffer) coating 8. FIGS. 2A and 2B depict another exemplary coated optical fiber 60, comprising a core 2, a cladding, 4, and an outer polymeric (tight buffer) coating 8 in contact with the cladding. The embodiment shown in FIGS. 2A and 2B notably does not include a primary buffer coating in contact with the cladding. FIGS. 3A and 3B depict exemplary coated fiber optic cables 70. Fiber optic cables are bundles of two or more optical fibers (which can comprise primary buffers 6 as shown), which may optionally include various other components, including, but not limited to, support elements.

The outer polymeric coatings 8 of the coated optical fibers and fiber optic cables provided herein are considered to be "tight buffers," as they are generally in direct contact with and attached to the underlying layer (e.g., the primary buffer 6 or the cladding 4). Advantageously, with the use of such "tight buffers," little to no gap is present between the outer polymeric coating and the underlying material.

It is noted that the coated optical elements provided herein, in addition to one or more optical fibers, may comprise any number of additional components. For example, coated optical elements can further comprise (e.g., within the outer polymeric coating) various other coating layers (e.g., polymeric coatings), support elements (e.g., wires, cables, rods, yarn), and the like.

The diameters of the final coated optical elements of the present disclosure are not particularly limited. Although not limited thereto, it is noted that the diameter of some common optical fibers can range from about 50 to about 250 microns (based on glass cladding diameter and/or primary buffer coating diameter), and common fiber optic cables are somewhat larger in diameter, as they generally comprise at least one fiber and at least one other component (e.g., a strengthening component) or at least two fibers. Again, although not limited thereto, the outer polymeric coating thickness (and, thus, the diameter of the coated substrate) can vary. In some embodiments, the average coating thickness is at least about 50 microns (e.g., about 50 microns to about 1000 microns) or at least about 100 microns and in some embodiments, the average coating thickness is about 250 microns to about 900 microns. Interestingly, in various embodiments, attenuation is not significantly affected by the outer polymeric coating thickness although, with traditional coated optical elements, attenuation has been previously noted to decrease with increasing outer polymeric coating thickness. As such, the thickness of the outer polymeric coating on the coated optical elements disclosed herein can vary widely, while maintaining attenuation and other physical properties of the coated optical elements within the ranges generally disclosed herein.

Advantageously, the coated optical elements disclosed herein exhibit good optical properties and in particular, low attenuation over a length of the coated substrate. Low attenuation is desirable because longer lengths of fiber can be used. Attenuation is generally the loss of optical power along a fiber as a result of absorption, scattering, bending, and other loss mechanisms as light travels through the fiber. Attenuation is commonly reported at a particular wavelength, in units of decibels per kilometer (dB/km). Low attenuation values are desirable because longer lengths of fiber can be used while allowing for the passage of a suitable amount of light therethrough.

Previously known coated optical elements exhibit substantially higher attenuation (i.e., more light loss over a given length of optical element) than the corresponding uncoated optical element. However, coated optical elements provided in accordance with this disclosure, in some embodiments, exhibit an attenuation that is no more than about 100%, no more than about 75%, no more than about 50%, or no more than about 25% above the attenuation of the corresponding uncoated optical element. In some embodiments, the coated optical element exhibits attenuation that is even lower (i.e., closer to the corresponding uncoated optical element), including an attenuation of no more than about 10% above that of the corresponding uncoated optical element, no more than about 5% above that of the corresponding uncoated optical element, and even an attenuation roughly equal to that of the corresponding uncoated optical element. In fact, in certain embodiments, the coated optical element exhibits attenuation that is less than that of the corresponding uncoated optical element.

Coated optical elements as disclosed herein often exhibit good stability in attenuation at various temperatures. It is generally known that attenuation exhibited by a given optical element is affected by the temperature at which the optical element is used/tested. In particular, many optical elements exhibit significantly higher attenuation at a given temperature after thermal cycling (e.g., to the maximum continuous use temperature for the buffer material). Advantageously, as demonstrated in Example 1, a PEEK-coated optical element according to the present disclosure did not exhibit a significant change in attenuation after thermal cycling. In one embodiment, a coated optical element is provided which exhibits little to no attenuation loss after thermal cycling to about 170° C., about 200° C., or about 250° C. (or even higher) and cooling to room temperature. For example, such optical elements may, in some embodiments, exhibit an attenuation at room temperature after thermal cycling that is about 2 times that of the as-produced tight buffer-coated optical fiber at room temperature (i.e., before thermal cycling) or less, including about 1.5 times or less, about 1.2 times or less, and about 1.1 times or less, e.g., an attenuation of about 1 to 2 times that of the corresponding uncoated optical fiber. In preferred embodiments, the attenuation after thermal cycling is at the lower end of that range, e.g., an attenuation of about 1 to about 1.5 times that of the as-produced tight buffer-coated optical fiber, about 1 to about 1.2 times that of the as-produced tight buffer-coated optical fiber, or about 1 to about 1.1 times that of the as-produced tight buffer-coated optical fiber. In certain embodiments, such values are relevant even after multiple heating and cooling cycles (e.g., 2 heat/cool cycles, 3 heat/cool cycles, 4 heat cool cycles, etc.).

In some embodiments, the attenuation after temperature cycling is reported by comparison to the attenuation of the uncoated optical element. The "uncoated optical element" in this context is analogous to the tight buffer-coated optical element, but without the tight buffer coating thereon. For example, when the tight buffer-coated optical element includes a core, cladding, primary buffer coating, and tight buffer coating, the "uncoated optical element" used for comparison includes a core, cladding, and primary buffer coating. When the tight buffer-coated optical element includes a core, cladding, and tight buffer coating, the "uncoated optical element used for comparison includes a core and cladding. For example, certain tight buffer-coated optical elements provided herein, after thermal cycling (e.g., over 1 heat/cool cycle) exhibit attenuation values of less than about 150% the attenuation values of the corresponding uncoated optical elements (which have not been subjected to thermal cycling). In various embodiments, such coated elements provided herein, after thermal cycling, exhibit attenuation values of less than about 125%, less than about 110%, less than about 105%, or less than about 100% the attenuation value of the corresponding uncoated optical element (which has not been subjected to thermal cycling).

In certain embodiments, other physical properties of the tight buffer-coated optical elements disclosed herein are significant as well. For example, in some embodiments, the polymeric tight buffer coating can exhibit decreased shrinkage (e.g., measured as a change in length and/or a change in diameter using high precision measurement techniques) when heated to a relatively high temperature (e.g., about 300° C.) relative to other known coated optical elements. Exemplary shrinkage values (after a single heating and cooling cycle) include, but are not limited to, shrinkages of less than about 50%, less than about 25%, less than about 15%, less than about 10%, less than about 5%, less than about 2%, less than about 1%, or less than about 0.5% in length and/or diameter as compared to the material at room temperature.

Interestingly, it is also noted that, for typical coated optical elements, concentricity affects attenuation. Concentricity is a measure of the uniformity of the cross-section of the coated substrate, and describes how well oriented the layers within the coated substrate are with respect to each other. Specifically, it is generally understood that optical elements exhibiting decreased concentricity with respect to one or more of the layers contained therein increased attenuation (higher light loss). However, the inventors have found that, with respect to the presently disclosed fibers, concentricity does not appear to have a significant effect on attenuation. In particular, even at 30% concentricity, coated optical fibers are provided herein which exhibit attenuation values falling within the disclosed ranges (e.g., having attenuation values comparable to those of the uncoated optical element).

EXAMPLE

An 0.025" outer diameter optical fiber with a 9 micron core diameter and 125 micron clad diameter, with a 150 micron outer diameter (OD) polyimide coating and an outer polymer coating of PEEK is evaluated for energy loss/attenuation using an optical time domain reflectometer (OTDR). The PEEK-coated fiber with 0.025" diameter exhibited a 0.531 dB/km attenuation, which is better than the uncoated (bare) optical fiber. This sample did not exhibit any thermal cycling effects. At room temperature, the attenuation of this PEEK-coated fiber at 1550 nm was 0.53 dB/km. The PEEK-coated sample was heated to 200° C., and the attenuation at 1550 nm at that temperature was 0.58 dB/km. The sample was cooled down to room temperature and the attenuation at 1550 nm after this heating cycle was 0.72 dB/km. Surprisingly (and in contrast to many known coated optical fibers), this coated fiber exhibited low attenuation at room temperature after thermal cycling.

INCORPORATION

The present patent application claims the benefit of the filing date of U.S. provisional patent application No. 62/323,195, filed Apr. 15, 2016, and U.S. provisional patent application No. 62/374,110, filed Aug. 12, 29016; and both of the foregoing are incorporated herein by this reference in their entireties.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A thermoplastic polymer-coated optical element comprising:
   an optical element, wherein the optical element comprises an optical fiber having a core, a cladding on at least a portion of an outer surface of the core, and a polymeric primary buffer coating on at least a portion of an outer surface of the cladding; and
   a thermoplastic polymeric tight buffer coating on at least a portion of an outer surface of the polymeric primary buffer coating of the optical element,
   wherein the thermoplastic polymeric tight buffer coating is in contact with the outer surface of the polymeric primary buffer coating with no airspace there between,
   wherein the polymer-coated optical element exhibits a first attenuation at room temperature of plus or minus 50% the attenuation of a comparable optical element with no thermoplastic polymeric tight buffer coating thereon, and
   wherein the polymer-coated optical element exhibits a second attenuation at room temperature after thermal cycling to a temperature of at least 170° C. that is about 2 times the first attenuation or less.

2. The polymer-coated optical element of claim 1, wherein the thermoplastic polymeric tight buffer coating comprises one or more of a polyaryletherketone (PAEK), a liquid crystal polymer, a polyamide-imide, and a polybenzimidazole.

3. The polymer-coated optical element of claim 1, wherein the thermoplastic polymeric tight buffer coating is selected from the group consisting of polyetherketone (PEK), polyetheretherketone (PEEK), polyetherketoneketone (PEKK), polyetheretherketoneketone (PEEKK), polyetherketoneetherketoneketone (PEKEKK), and combinations thereof.

4. The polymer-coated optical element of claim 1, wherein the thermoplastic polymeric tight buffer coating comprises polyetheretherketone (PEEK).

5. The polymer-coated optical element of claim 1, wherein the thermoplastic polymeric tight buffer coating consists essentially of the thermoplastic polymer.

6. The polymer-coated optical element of claim 1, wherein the thermoplastic polymeric tight buffer coating comprises less than about 30% by weight of components other than the thermoplastic polymer.

7. The polymer-coated optical element of claim 1, wherein the optical element is an optical fiber.

8. The polymer-coated optical element of claim 1, wherein the core and cladding consist essentially of silica.

9. The polymer-coated optical element of claim 1, wherein the primary buffer coating comprises a polyimide.

10. The polymer-coated optical element of claim 1, wherein the optical element is a fiber optic cable.

11. The polymer-coated optical element of claim 1, wherein the first attenuation is plus or minus 20% the attenuation of a comparable optical element with no thermoplastic polymeric tight buffer coating thereon.

12. The polymer-coated optical element of claim 1, wherein the first attenuation is less than or equal to the attenuation of a comparable optical element with no thermoplastic polymeric tight buffer coating thereon.

13. The polymer-coated optical element of claim 1, wherein the first attenuation is less than 1.0 dB/km.

14. The polymer-coated optical element of claim 1, wherein the second attenuation is about 1.5 times the first attenuation or less.

* * * * *